R. WHITAKER.
REFRIGERATING APPARATUS.
APPLICATION FILED MAR. 3, 1905.
911,635.
Patented Feb. 9, 1909.
2 SHEETS—SHEET 1.
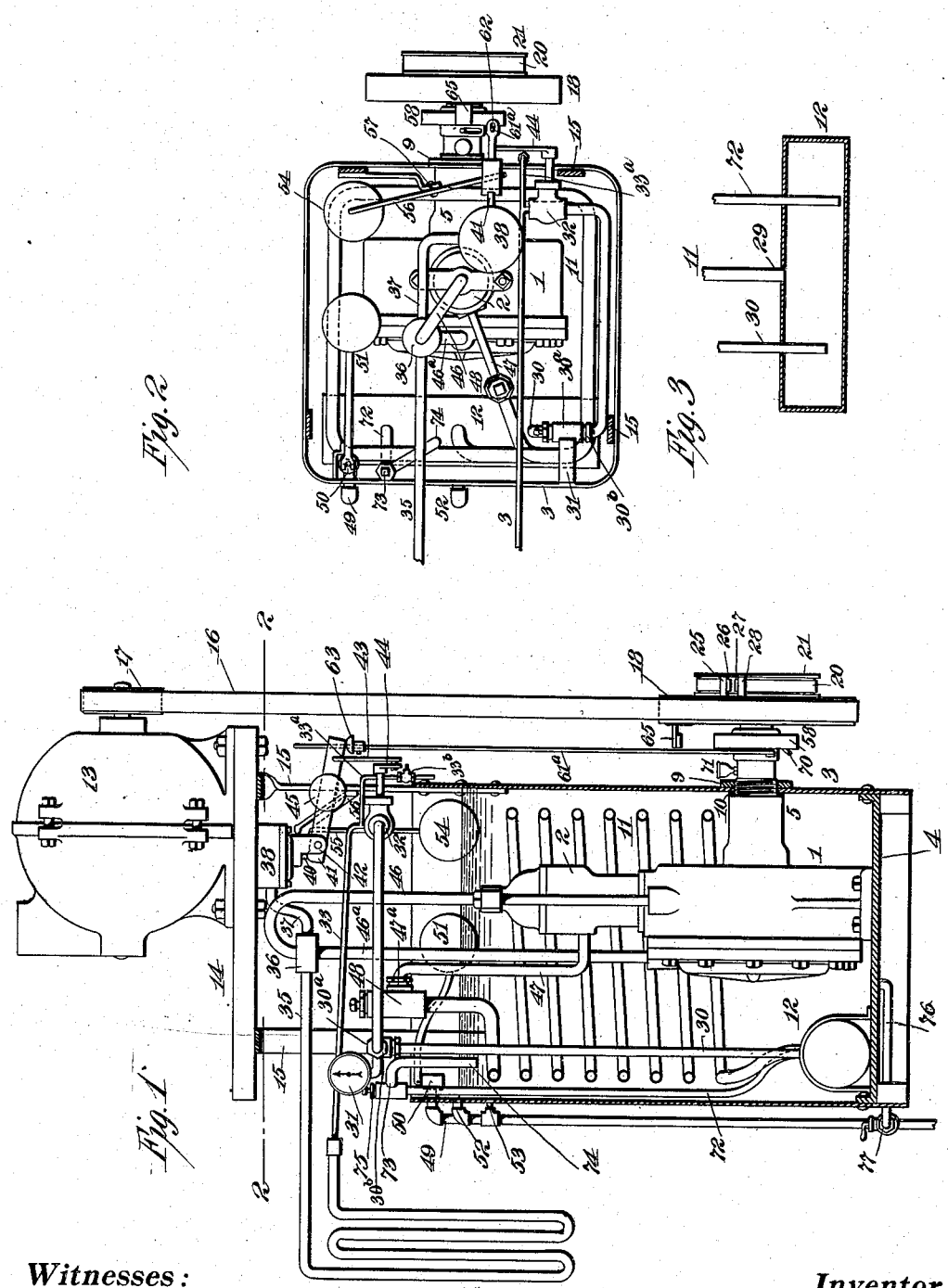
Witnesses:
Jas. F. Coleman
John F. Finch.
Inventor
Richard Whitaker
By Dyer & Dyer
Attorneys.

R. WHITAKER.
REFRIGERATING APPARATUS.
APPLICATION FILED MAR. 3, 1905.
911,635.
Patented Feb. 9, 1909.
2 SHEETS—SHEET 2.
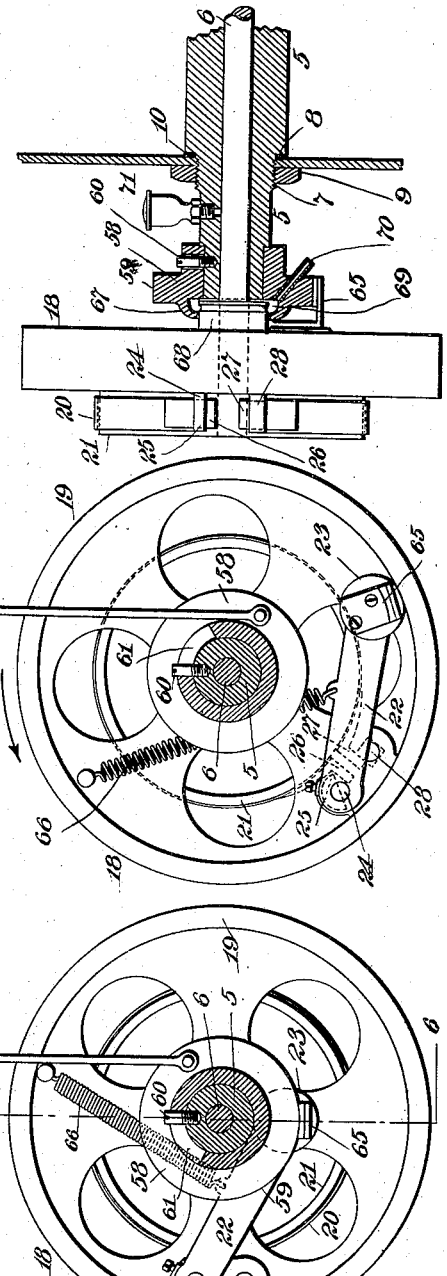
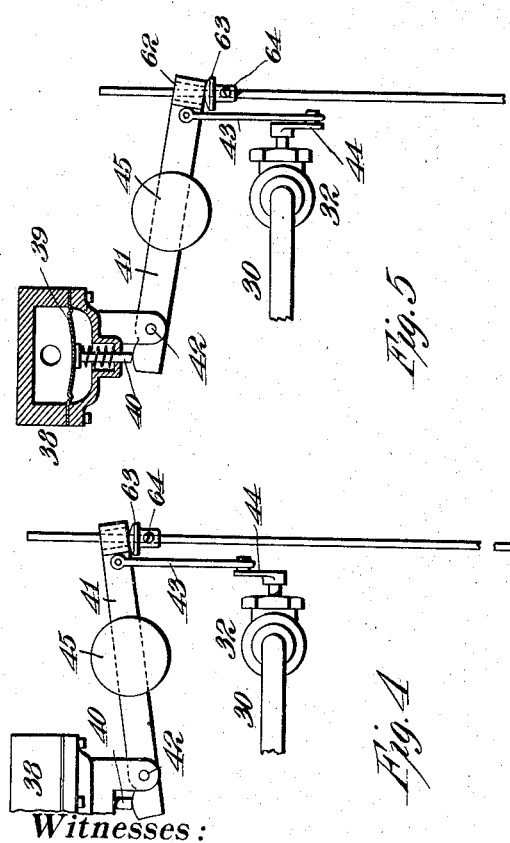
Witnesses:
Jas. F. Coleman
John S. Kock
Inventor
Richard Whitaker
By Dyer & Dyer
Attorneys.

UNITED STATES PATENT OFFICE.

RICHARD WHITAKER, OF NEW BRUNSWICK, NEW JERSEY, ASSIGNOR, BY DIRECT AND MESNE ASSIGNMENTS, TO BRUNSWICK REFRIGERATING COMPANY, A CORPORATION OF NEW JERSEY.

REFRIGERATING APPARATUS.

No. 911,635.   Specification of Letters Patent.   Patented Feb. 9, 1909.

Application filed March 3, 1905. Serial No. 248,246.

*To all whom it may concern:*

Be it known that I, RICHARD WHITAKER, a citizen of the United States, residing in the city of New Brunswick, county of Middlesex, and State of New Jersey, have invented a certain new and useful Improvement in Refrigerating Apparatus, of which the following is a description.

The object I have in view is the production of a refrigerating plant, which will be simple, and thoroughly practicable, and which may be made in small sizes and used in private residences, where it may not receive expert care and attention.

Other objects are to produce a device which will be safe, which will be highly efficient and entirely automatic in operation, as well as cheap to construct and compact.

I attain these objects by the mechanism illustrated in the accompanying drawings, in which, Figure 1 is a side elevation of the complete device, the tank being shown in section, and the expansion coil being conventionally illustrated. Fig. 2 is a top view thereof taken on the lines 2—2 of Fig. 1, the expansion coil being omitted. Fig. 3 is a longitudinal sectional view of the ammonia vessel. Fig. 4 is an enlarged side view of the cut off mechanism showing it in the position with the expansion valve closed. Fig. 5 is a view of the same showing it in the position with the expansion valve open. Fig. 6 is a view partly in section taken on the lines 6—6 of Fig. 4, the fly wheel and the connecting clutch being shown in elevation.

In all the views like parts are designated by the same reference characters.

In carrying out my invention I provide a compressing or gas pump 1, a convenient form being illustrated in my application for patent Serial No. 188,612, filed Jan. 11, 1904. The gas pump, however, differs from that illustrated in my said application in that the cylinder 2 is not water jacketed. The pump is secured within a tank 3, as shown in the drawings, it is bolted to the bottom 4 thereof. This tank is adapted to be filled with water and will contain the gas pump, the cooling coil, and the ammonia receiving vessel. The pump is provided with a sleeve 5, through which a shaft 6 passes, the sleeve being screw threaded at 7 and provided with a shoulder 8. The threaded portion passes through an opening in the walls of the tank 3, and a nut 9 is used to compress a gasket 10 placed between the wall and the shoulder 8. This structure will constitute a water tight joint. Within the tank 3 is arranged the cooling coil 11 and the ammonia receiving vessel 12. For compactness the cooling coil is preferably coiled around the upper portion of the tank and the ammonia vessel is preferably placed upon the bottom 4 of the tank so that the ammonia will drain into it.

The actuating motor, in this embodiment of the invention, an electric motor, 13, is supported upon a table 14 which is carried by standards 15 secured to the walls of the tank 3. The motor drives the pump by means of a belt 16 passing over a pulley 17 on the motor shaft, and a pulley 18 upon the pump shaft 6. The pulley 18 is provided with a thickened rim 19, so that it will serve as a fly wheel and is connected to the shaft 6 by means of a band brake 20 engaging with a pulley 21 secured to the shaft 6. The said brake is engaged with the pulley by means of a lever 22 carrying a weight 23 and secured to a rock shaft 24. This rock shaft is provided with a cam 25 which engages with an offset 26 on one extremity of the band brake 20. The other extremity of the band is offset at 27 and engages with a pin 28.

The device thus described is identical with that disclosed in my copending application for patent filed Jan. 25th, 1905, Serial No. 242,594, and is a convenient means of connecting the motor with the pump in such a manner that the motor may be started from rest and will attain a considerable speed and store up energy in the fly wheel before the latter is automatically coupled to the pump, so that the latter will be started. The exact form of device described need not be employed, however, and if desired, the motor can be connected directly to the pump shaft without the use of any such mechanism.

The outlet of the coil 11 connects at 29 with the ammonia vessel 12. An exit pipe 30, which extends down part way into the vessel, extends upward above the walls of the tank 3, and may be provided, if desired, with a pressure gage 31. The pipe extends horizontally to the expansion valve 32, and from there a pipe 33 extends to the expansion coil 34. The expansion coil is placed within the cooling chamber and may be arranged at any place convenient to the rest of the apparatus. The exit pipe 35 from the coil 34 enters a coupling 36 and from this coupling a branch 37 extends to a chamber 38, which contains a diaphragm 39, see Fig. 5. Engaging this diaphragm is a pin 40, the free end of which rests upon a lever 41. The lever 41 is pivoted to a racket 42 carried by the chamber 38. The other end of the lever 41 is connected by a link 43 to a lever 44 which controls the expansion valve 32. The construction is such that upon the pressure exceeding a certain amount within the chamber 38, the diaphragm will be flexed, the free end of the lever 41 elevated, and the expansion valve 32 closed. Upon the pressure dropping below a certain point, the lever 41 will drop and open the valve. This movement will be accelerated by means of the weight 45 carried upon the lever 41.

From the union 36 a pipe 46 extends to the pump 2 and from the latter the pipe 47 for containing the compressed gas passes into a valve 48, connected to the coil 11. A pipe 46$^a$ connects the condensing chamber of the pump with the union 36, so that gas escaping by the piston of the pump will escape from the condensing chamber into the coupling, and will be passed through the pump again. This completes the circulating system.

In operation, the tank 3 is to be nearly filled with water, preferably to about the level shown in Fig. 1. This water will serve as a cooling medium for the pump, the coil and the ammonia vessel 12 and will also serve as a means for absorbing any leakage within that part of the system below the surface of the water. In order to control the level of the water the following mechanism is employed: An inlet pipe 49 is provided with a valve closure 50, the latter being controlled by a lever and float 51, pivoted adjacent to the exit of the pipe 49. This lever and float are so adjusted that upon the level of the water exceeding a certain amount, the supply of water will be cut off. I do not illustrate the connections of the valve in detail as any well known device may be employed for this purpose. An over flow pipe 52 is placed below the level of the inlet pipe 49, the distance separating the two being sufficient to cause a ready and positive operation of the valve 50. The pipe 52 is as large as the pipe 49 or it may be somewhat larger. Connected to the pipe 52 is a smaller pipe 53, entering the tank a short distance below the latter pipe. This pipe 53 is of very much smaller size than the pipe 52 and its purpose will be as presently explained. In connection with this apparatus is employed a second float 54 carried upon an arm 55. This arm is connected to a lever 56, which is supported upon a fixed pivot 57. The other end of the lever 56 is arranged to engage with the lever 41 or as shown in the drawings with the weight 45.

The float and levers are arranged so that upon the level of the water within the tank 3 being lowered the descent of the float will cause a corresponding elevation of the lever 41, and with it a closure of the expansion valve 32. The purpose of the pipe 53 and the float 54 and its connections is to provide a means for cutting off the supply of ammonia to the pump if for any reason the supply of water from the pipe 49 should cease or the valve 50 should become choked. In that event the overflow will discharge through the pipe 52 until the latter is above the level of the water, then it will flow solely through the smaller pipe 53. The size of the latter and its distance below the pipe 52 are so proportioned and arranged that the level of the water will be lowered sufficiently to close the expansion valve by means of the float 54 before the water within the tank 3 has reached such a temperature that it will be unsuitable or unsafe. Should the supply of water in the pipe 49 cease for only a short time, the apparatus would not be stopped.

In connection with the device already described I provide a means for closing the expansion valve, when the mechanism is at rest. This device is illustrated in detail in Figs. 4 to 6. Upon the extension 5 of the pump 1 outside of the tank is mounted a disk or drum 58 preferably having a smooth periphery 59. This disk is arranged to turn freely upon the extension 5, but its extent of movement is limited by a pin 60, which passes through a slot 61 on the hub of the disk. Connected to the disk is a rod 61$^a$ which passes through an opening 62 in the free end of the lever 41. A stop 63 is carried by the rod 61$^a$ and is adapted to engage with the under side of the lever, and elevate it upon the rod being elevated. This stop may be secured in place by a screw 64 so as to be adjustable. Upon the lever 22 is carried a brake shoe 65, which may be caused to engage with the periphery of the disk 59 by means of a spring 66. The disk 58 upon being oscillated upon the extension 5 to the extent of the limit of movement afforded by the slot 61 and pin 60 will serve to entirely close the expansion valve when the rod 61$^a$ is elevated or to permit it to be entirely opened when it is depressed. The opening 62 is sufficiently large to allow the lever 41 to be elevated or depressed entirely independent of the rod 61$^a$ when the latter is in the lowermost position. Upon it being elevated however, as shown in Fig. 4, it will elevate the lever 41 and prevent the latter from being lowered. The disk 58 is oscillated upon the support 5 in one direction by means of the brake shoe 65 which is carried by and rotates with the fly wheel 18. Upon the latter being rotated as shown in the direction indicated by the arrows in Figs. 4 and 5, the brake shoe will turn upon the disk, and tend to rotate it to the left, so as to cause the end of the slot 61 to engage with the pin 60 and elevate the rod 61ª to the full extent of its upward movement. This will close the expansion valve. On any further movement of the fly wheel the brake shoe will slide on the smooth periphery of the disk. Upon the speed of the fly wheel 18 being raised to a sufficient point to cause the weight 23 by centrifugal action to overcome the tension of the spring 66 the weight will fly outward releasing the brake shoe 65 from contact with the periphery of the disk 58. This will no longer hold the disk in position with the rod 60 elevated, and the latter will descend, owing to the weight of the lever 41, and the weight 45, thus revolving the disk 58 backwards when the parts will assume the position shown in Fig. 5 with the valve 32 open and the disk will remain in this position until the fly wheel 18 ceases to revolve at a sufficiently high rate of speed to cause the weight 65 to be thrown outward. When this situation occurs the spring 66 will draw in the brake shoe against the drum 58 and clamping the two together will rotate the disk in the direction of the rotation of the wheel again lifting the rod 61ª and closing the valve. It is to be understood that while the valve parts, which comprise the lever 41, the weight 45 and the rod 61ª, are sufficiently heavy to cause the disk to rotate when the brake shoe is disengaged from it, they are not sufficiently heavy to cause the pulley or cause the pulley and motor to rotate backward when the brake shoe is in engagement with the disk, therefore when the motor is at rest the valve lever will not drop.

In order to lubricate the shaft 6 and prevent the lubricant from flying outward, becoming lost and spattering upon the belt 16, the device illustrated in Fig. 6 is employed. The disk 58 is provided with an annular lip 67 which surrounds the hub 68 of the fly wheel 18. This will produce an annular cup shaped cavity, 69, surrounding the hub and within which the oil will be collected. An oil passage 70 permits escape of oil from this annular cavity and directs it inward toward the wall of the tank, and away from the rotating parts and belt. An oil cup 71 admits lubricant to the shaft 6, part of the lubricant flowing outward to lubricate the outward part of the shaft and part inward to lubricate the moving mechanism of the pump.

In order to draw off the ammonia from the vessel 12, a pipe 72 is provided, see Figs. 1, 2 and 3. This pipe passes down almost to the bottom of the vessel, and extends above the surface of the water to the point 73 and its outlet 74 is arranged below the level of the water. A valve 75 is provided in the pipe above the water level. By opening this valve the pressure of the ammonia within the vessel 12 will cause it to pass up through the pipe 72 and passing through the outlet 74 below the water will mix with the latter and will not escape into the atmosphere. A draw off pipe 76 and a cock 77 permits the emptying of the tank 3 for the inspection or repair of the various machinery therein contained.

The operation of the entire apparatus is as follows: The inlet pipe 49 will supply water to the tank 3 so that the latter will be filled to the determined level. The motor being started will, after it attains a sufficient speed to overcome the inertia of the pump, start the latter. In the meantime the liquid ammonia will have entered the pipe 30 and as soon as the expansion valve is opened will expand in the expansion coil 34. The extent of opening of the expansion valve will be controlled by the amount of back pressure within the coil through the agency of the diaphragm 39 and lever 41 and link 42. From the coupling 36 the expanded ammonia gas is passed through the pipe 46 into the pump and will be there compressed, the compressed gas passing through the pipe 47 through the coil 11 where it will be cooled and into the ammonia vessel 12. By having the vessel 12 within the tank 3 the liquid ammonia will be kept cool and the efficiency of the device greatly increased. Should for any reason the supply of water to the tank 3 be stopped the expansion valve will be closed before the temperature of the water within the tank is increased to an alarming extent, the expansion valve being closed, no more gas will enter the expansion coil and consequently the pump will soon be working against a vacuum. When the motor 13 is stopped the expansion valve will be closed by means of the cut off mechanism, so that there will be no leakage in the system at this point.

By placing the pump, coil and ammonia vessel within the tank and mounting the motor over it, a device which is extremely compact and which will occupy a minimum of floor space is provided. This is particularly advantageous in small isolated plants for private residences. The pump being placed within the water tank is kept entirely cool and requires no water jacket and consequently is made much more simple and cheaper than where such jacket is used. Should any of the parts leak or become broken there will be no danger from the escape of ammonia as the latter will be absorbed by the water. Furthermore by mounting the pump within the tank no pipes for circulation of water through the pump will be required, and consequently there will be no difficulty with leaky joints between the pipes and pump, the latter vibrating to some extent while in use, and thereby causing difficulty with the joints.

The device also has the great advantage, as the water tank serves as an insulating means for the ammonia. In the event of fire there will be no danger of explosion as the ammonia within the water tank will not be raised to a dangerously high temperature.

For the purpose of removing the condensing coil and ammonia vessel, I provide the following mechanism: The pipe 30 is provided at a point above the level of the water in the tank with a valve $30^a$. This valve is provided with a union $30^b$ by means of which the two parts of the pipe may be separated. The valve 48 is connected to the pipe 47 by means of a union $47^a$. By closing the valves 48 and $30^a$ and separating the pipe by means of the unions $47^a$ and $30^b$, the ammonia vessel and condensing coil may be removed, the attachments of the vessel to the bottom 4 of the tank being first loosened. The parts removed will contain the compressed ammonia gas or liquid ammonia which cannot escape owing to the two valves at both ends of the system.

For the purpose of charging the system with ammonia, a small elbow $33^a$ provided with a valve $33^b$ is secured to the pipe 33. This valve is first opened and the liquid ammonia introduced into the pipe 33 from a flask.

Having now described my invention, what I claim and desire to secure by Letters Patent, is:—

1. In a refrigerating apparatus, the combination with a tank, of a pump within the tank, a supply pipe for the tank, an overflow pipe, an expansion coil, a valve therefor, and a float and connection between the float and expansion valve for closing the latter by the lowering of the level of the water within the tank, said pump being a gas or compression pump and connected with said expansion coil.

2. In a refrigerating apparatus, the combination with a tank, of a pump therein, means for admitting water to the tank, an overflow pipe, an overflow pipe below the first overflow pipe, an expansion coil, a valve therefor, and a float for closing the valve as the level of the water drops from the one overflow pipe to the other, said pump being a gas or compression pump and connected with said expansion coil.

3. In a refrigerating apparatus, the combination with a tank, of a pump therein, means for admitting water to the tank, an overflow pipe, a smaller overflow pipe below the first overflow pipe, an expansion coil, a valve therefor, and a float for closing the valve as the level of the water drops from the one overflow pipe to the other, said pump being a gas or compression pump and connected with said expansion coil.

4. The combination with a pump, of means for actuating the pump, an expansion coil and a valve giving communication thereto, and means controlled by the pump actuating mechanism for closing the expansion valve when the actuating mechanism is at rest or rotates below a predetermined speed, said pump being a gas or compression pump and connected with said expansion coil.

5. The combination with a gas or compression pump and an expansion coil connected therewith, of a wheel upon the shaft of the pump, means for rotating the wheel, a weight rotating with the wheel, a brake shoe controlled by the weight, a disk, a spring for engaging the shoe with the disk, and connections between the disk and the expansion valve for closing the latter when the wheel is at rest or is rotating with insufficient speed to disengage the shoe from the disk.

6. In a refrigerating apparatus, the combination with a gas or compression pump, an expansion coil connected therewith and an expansion valve for said coil, of a pulley for moving the pump, a disk, means for connecting the pulley and disk, means for limiting the rotary movement of the disk, a rod moved by the disk, and connections between the rod and the expansion valve for closing the latter by the rotation of the disk.

7. In a refrigerating apparatus, the combination with a gas or compression pump, an expansion coil connected therewith and an expansion valve for said coil, of means for automatically opening and closing the valve, such means being controlled by the pressure within the system, means for rotating the pump, and means controlled by the pump rotating means for independently controlling the expansion valve.

8. In a refrigerating apparatus, the combination with a tank normally containing water at a predetermined level, of a gas or compression pump within the tank, an expansion coil connected with said pump, a valve for said coil, and means adapted upon the lowering of the level of the water in the tank to close said valve, said pump being submerged within the water in the tank.

This specification signed and witnessed this second day of Mar., 1905.

RICHARD WHITAKER.

Witnesses:
LEONARD H. DYER,
JOHN S. LOTSCH.